US012763243B2

(12) United States Patent
Tesson et al.

(10) Patent No.: US 12,763,243 B2
(45) Date of Patent: Oct. 13, 2026

(54) TRANSFORMER

(71) Applicant: NXP B.V., Eindhoven (NL)

(72) Inventors: Olivier Tesson, Bretteville l'Orgueilleuse (FR); Konstantinos Giannakidis, Eindhoven (NL)

(73) Assignee: NXP B.V., Eindhoven (NL)

(*) Notice: Subject to any disclaimer, the term of this patent is extended or adjusted under 35 U.S.C. 154(b) by 951 days.

(21) Appl. No.: 18/054,217

(22) Filed: Nov. 10, 2022

(65) Prior Publication Data

US 2023/0170126 A1 Jun. 1, 2023

(30) Foreign Application Priority Data

Dec. 1, 2021 (EP) .................................... 21306676

(51) Int. Cl.
*H01F 27/00* (2006.01)
*H01F 27/28* (2006.01)
*H01F 29/02* (2006.01)

(52) U.S. Cl.
CPC ....... *H01F 27/006* (2013.01); *H01F 27/2804* (2013.01); *H01F 29/025* (2013.01)

(58) Field of Classification Search
CPC ......... H01F 27/2804; H01F 2027/2809; H01F 17/0006; H01F 17/0013; H01F 5/003; H01F 30/02; H01F 27/006; H01F 29/205
USPC .................................................. 336/200, 232
See application file for complete search history.

(56) References Cited

U.S. PATENT DOCUMENTS 6,870,457 B2 * 3/2005 Chen ...................... H10D 84/00 336/200
7,332,993 B1 * 2/2008 Nussbaum .......... H01F 27/2804 336/200
8,576,037 B1 * 11/2013 Ji ........................... H01F 30/04 336/215
9,159,484 B2 10/2015 Tiemeijer
2008/0272875 A1 * 11/2008 Huang ................ H01F 17/0013 336/182
2011/0037405 A1 * 2/2011 Suganuma ............ H02M 7/003 336/200

(Continued)

FOREIGN PATENT DOCUMENTS

CN 111510072 A * 8/2020 ............... H03D 7/16
JP 2010050160 A * 3/2010

(Continued)

OTHER PUBLICATIONS

Anjos, E., "A 0.2 mm2 26.5-29.5 GHz Receiver Phased-Array Front End With 360° Continuous Tune Phase-Shifter Based on All-Pass Networks", IEEE Transactions on Microwave Theory and Techniques, Jun. 29, 2021.

(Continued)

*Primary Examiner* — Tszfung J Chan

(57) ABSTRACT

A transformer (100, 100') is disclosed, comprising a first conducting element (110) having a first lobed portion (114) arranged to form a first plurality of lobes (116); and a second conducting element (120) having a second lobed portion (124) arranged to form a second plurality of lobes (126); wherein said first lobed portion (114) overlaps said second lobed portion (124) to define a plurality of enclosed areas (130). The transformer is adapted for applications requiring an autotransformer having a weak, negative magnetic coupling coefficient.

20 Claims, 3 Drawing Sheets

(56) References Cited

U.S. PATENT DOCUMENTS

| | | | | |
|---|---|---|---|---|
| 2014/0077919 | A1* | 3/2014 | Godoy | H01F 30/08 336/226 |
| 2017/0098500 | A1* | 4/2017 | Yen | H01F 27/29 |
| 2018/0191235 | A1* | 7/2018 | Chen | H01F 27/2804 |
| 2019/0068166 | A1* | 2/2019 | Ishizuka | H03H 7/21 |
| 2020/0145237 | A1* | 5/2020 | Bhagwat | H01F 27/28 |
| 2023/0093818 | A1* | 3/2023 | Murasaki | H02J 50/10 257/531 |

FOREIGN PATENT DOCUMENTS

| | | | | |
|---|---|---|---|---|
| WO | WO-9302415 A1 | * | 2/1993 | G01R 31/31915 |
| WO | WO-2020039787 A1 | * | 2/2020 | H05K 1/165 |

OTHER PUBLICATIONS

Anjos, E., "All-Pass Networks for Millimeter-Wave 5G: Phase-Shifters and Beyond", Thesis, Arenberg Doctoral School, Faculty of Engineering Science, Dec. 2020.

Long, J., "Monolithic Transformers for Silicon RF IC Design", IEEE Journal of Solid-State Circuits, vol. 35, No. 9, Sep. 2000.

Van Zeijl, P., "Apollo passive phase shifter based on the work of Eduardo V.P. Anjos", Feb. 24, 2021.

* cited by examiner

TRANSFORMER

CROSS-REFERENCE TO RELATED APPLICATIONS

This application claims the priority under 35 U.S.C. § 119 of European Patent application no. 21306676.4, filed on 1 Dec. 2021, the contents of which are incorporated by reference herein.

FIELD OF THE DISCLOSURE

The present disclosure relates to a transformer. In particular, but not exclusively, it relates to a monolithic auto-transformer suitable for providing a small, negative value magnetic coupling coefficient.

BACKGROUND OF THE DISCLOSURE

There exist many ways to design on-chip monolithic transformers. The main electrical parameters of interest to a circuit designer are the transformer turns ratio n and the coefficient of magnetic coupling k. If the magnetic coupling between windings is perfect (i.e., no leakage of the magnetic flux), k is unity, while uncoupled coils have a k-factor of zero. A practical transformer will have a k-factor between these two extremes. Typically for on-chip monolithic transformers, a k-factor between 0.7 and 0.85 can be achieved.

Architectures for on-chip monolithic transformers include parallel architecture (Shibata type), interleaved architecture (Frlan type), and stacked architecture (Finlay type). FIG. 1(*a*) illustrates the Shibata type, in which the primary and secondary windings 10, 12 are provided as nested coils. This topology is easy to design but the total lengths of the primary and secondary windings are not equal. Hence the transformer turns ratio can differ from unity despite having the same number of turns of metal on each winding. FIG. 1(*b*) illustrates the Frlan type, which partially eliminates this asymmetry by providing the primary and secondary windings 20, 22 as interleaved or bifilar coils. FIG. 1(*c*) illustrates the Finlay type, in which the primary and secondary windings 30, 32 are provided as stacked coils. This requires less area than an interleaved architecture and hence allows higher coupling coefficients to be reached. However, the upper metal layer is generally much thicker than the intermediate metal layer, leading to higher electrical resistance and thus increased IL (Insertion Loss) of the upper winding. This can lead to an asymmetry in the electrical response of the transformer. Also, the upper winding is electrically shielded from the "conductive" substrate by the lower winding, and hence the parasitic capacitance to the substrate (and the associated dissipation) differs for each winding. In addition, there is a large parallel plate component to the capacitance between windings due to the overlapping metal layers, which limits the frequency response in view of mm-Wave applications.

However, existing techniques and architectures for designing transformers and auto-transformers having intermediate or high magnetic coupling coefficient are not suitable for applications requiring a weak (e.g., less than 0.1) and negative coupling coefficient. Low magnetic coupling coefficients cannot be achieved by simply increasing the separation of the primary and secondary windings in existing architectures as this leads to a large area and increased losses.

SUMMARY OF THE DISCLOSURE

Aspects of the disclosure are set out in the accompanying claims. Combinations of features from the dependent claims may be combined with features of the independent claims as appropriate and not merely as explicitly set out in the claims.

According to an aspect of the disclosure, there is provided a transformer comprising:

a first conducting element having a first lobed portion arranged to form a first plurality of lobes; and a second conducting element having a second lobed portion arranged to form a second plurality of lobes;

wherein said first lobed portion overlaps said second lobed portion to define a plurality of enclosed areas.

An advantage of the transformer of the present disclosure is that it may provide a transformer (including an autotransformer) having both a low absolute value of magnetic coupling coefficient, for example less than 0.1, and a relatively small area or footprint. The transformer may also have a negative magnetic coupling coefficient.

Successive lobes of the first plurality of lobes may be formed by portions of the first conducting element arranged to wind in opposite senses.

As a result, a current flowing in the first conducting element may produce a magnetic field in the plurality of enclosed areas which may be oriented in opposite directions in adjacent enclosed areas. This may also help to reduce the sensitivity of the transformer to coupling of external radiation. Similarly, successive lobes of the second plurality of lobes may be formed by portions of the second conducting element arranged to wind in opposite senses.

Each lobe of said first and/or second plurality of lobes may comprise only a partial turn of the respective conducting element.

In this way, each enclosed area of said plurality of enclosed areas may be defined by a partial turn of the first conducting element on one side, and a partial turn of the second conducting element on the other side. For example, each lobe may comprise a half turn of the respective conducting element. Adjacent enclosed areas of said plurality of enclosed areas may be separated by crossing points of said first and second conducting elements.

A number of lobes comprised by said first plurality of lobes may be equal to a number of lobes comprised by said second plurality of lobes.

Said first lobed portion and said second lobed portion may together form a symmetric pattern.

The number of lobes comprised by said first plurality of lobes may be an even number.

By providing an even number of lobes, cancellation of magnetic fields at adjacent enclosed areas and immunity to coupling of environmental radiation may be improved.

In some embodiments, said first conducting element further comprises a first outer portion connected at one end to a first end of said first lobed portion, and said second conducting element further comprises a second outer portion connected at one end to a first end of said second lobed portion.

Said first outer portion and said first lobed portion may be arranged to form a first loop; and said second outer portion and said second lobed portion may be arranged to form a second loop, said second loop at least partially overlapping said first loop.

In some embodiments, at least a portion of said first outer portion and/or said second outer portion is substantially straight.

This may be helpful in reducing the overall area of the transformer.

The transformer may be substantially symmetric.

In some embodiments, a second end of said first lobed portion is connected to a second end of said second lobed portion.

In this way, the transformer may be configured as an autotransformer. Advantageously, the connection between the second ends of the first and second lobed portion may provide convenient access for a center tap of the autotransformer. Said second end of said first lobed portion may be adjacent or overlapping said second end of said second lobed portion. For example said second ends of said first and second lobed portions may be located at a crossing point of said first and second conducting elements.

Said second end of said first lobed portion and said second end of said second lobed portion may be connected to ground, for example to a ground plane.

The connection to ground may be via a switch.

In some embodiments, the transformer is an autotransformer.

The first and second conducting elements may provide the primary and secondary sides respectively of the autotransformer, the first and second conducting elements being connected in series.

In some embodiments, said first outer portion is further arranged to define a full turn of the first conducting element, and/or said second outer portion is further arranged to define a full turn of the second conducting element.

Including a full turn in one or both of the first and second outer portions may facilitate optimising the design of the transformer for a specific application, to a specific frequency or frequency range depending on the application. However, these tuning elements may be omitted if required to reduce the footprint or overall area of the transformer.

The transformer may be formed on a substrate.

For example, the transformer of the present disclosure may be implemented as a planar monolithic transformer. For example, the transformer may be formed on a PCB or on any dielectric or semiconductor substrate, including silicon and GaN. The transformer may be implemented in an integrated circuit, for example an RFIC.

According to a further aspect of the present disclosure, there is provided a passive phase shifter comprising a transformer as defined above.

The transformer defined above may be particularly useful in applications where Phase-to-Gain must be minimised, for example in integrated 0/90° Passive Phase shifter (PPS) for analog beam-forming applications, which may require the Phase-to-Gain to vary by less than 0.5 dB between the two modes, since this is only achievable for weak negative values of k, for example in the range −0.05 to −0.15.

BRIEF DESCRIPTION OF THE DRAWINGS

Example embodiments of the present disclosure will be described, by way of example only, with reference to the accompanying drawings in which like reference signs relate to like elements and in which.

DETAILED DESCRIPTION

Figure 1:
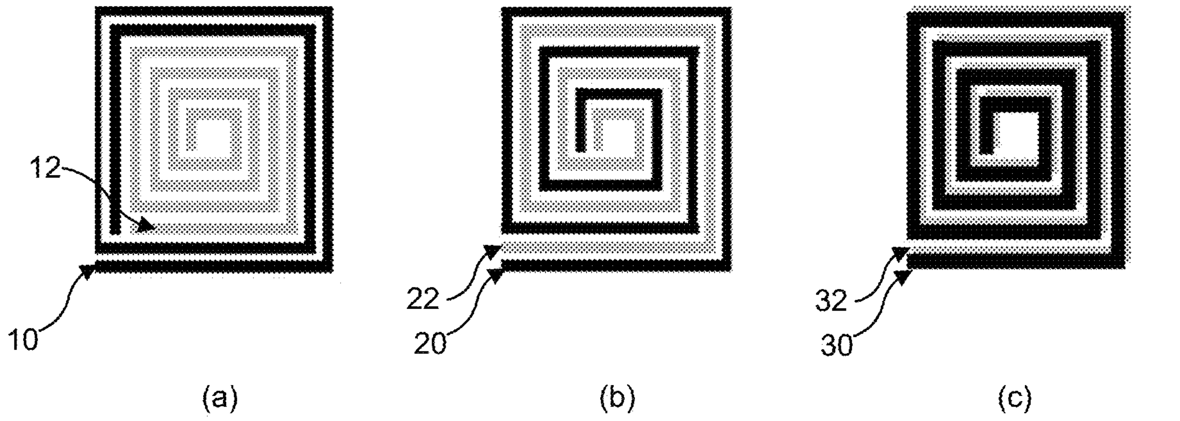
FIG. 1 schematically illustrates various monolithic transformer architectures: (a) parallel windings, (b) interleaved windings, and (c) stacked windings.
Figure 2:
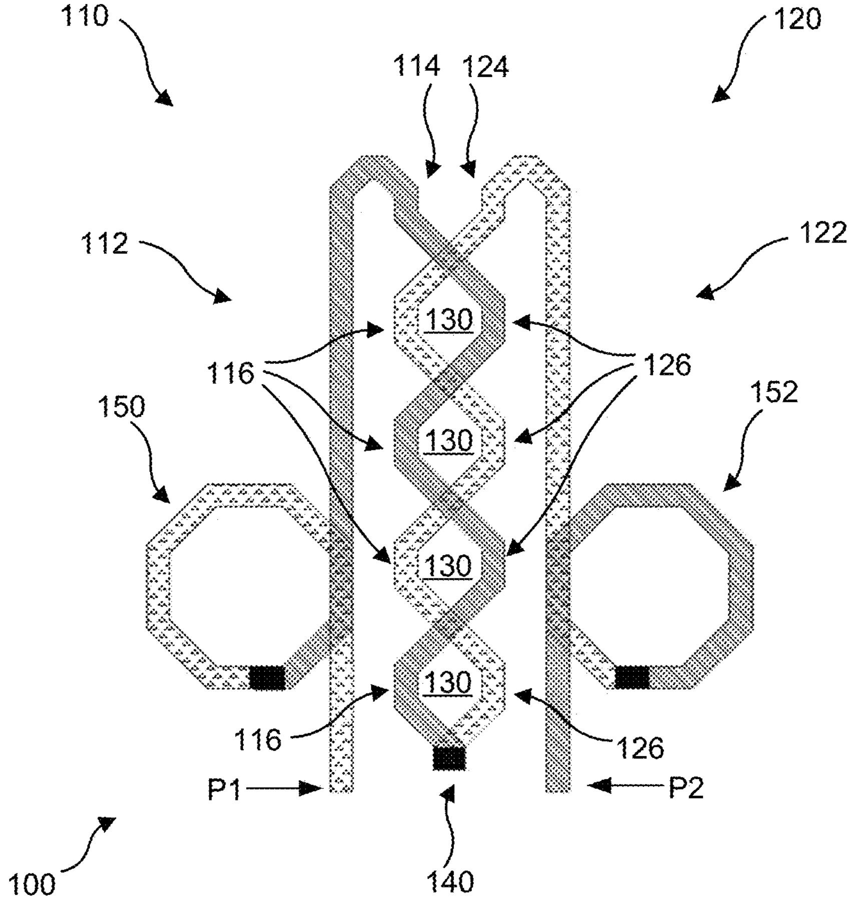
FIG. 2 shows a configuration of a transformer according to an example embodiment of the present disclosure.

FIG. 2 illustrates a configuration of a transformer 100, in the form of a planar monolithic autotransformer 100, according to an example embodiment of the present disclosure. The autotransformer 100 comprises a first conducting element 110 and a second conducting element 120, effectively forming the primary and secondary sides respectively of the autotransformer 100. The first conducting element 110 includes a first outer portion 112 and a first lobed portion 114, which together form a first loop. The first outer portion 112 extends from a first terminal P1 to a first end of the first lobed portion 114. Similarly, the second conducting element 120 includes a second outer portion 122 and a second lobed portion 124, which together form a second loop, the second outer portion 122 extending from a second terminal P2 to a first end of the second lobed portion 124. The first lobed portion 114 is arranged to form a first plurality of lobes 116, and the second lobed portion 124 is arranged to form a second plurality of lobes 126.

Each of the first and second pluralities of lobes 116, 126 corresponds to a sequence of partial turns of the respective conducting element 110, 120, with each successive lobe 116, 126 winding in an opposite sense to the preceding lobe 116, 126. The first and second conducting elements 110, 120 are arranged such that the first lobed portion 114 overlaps the second lobed portion 124 to define a plurality of enclosed areas 130. Each enclosed area 130 is bounded by a lobe 116 of the first conducting element 110 on one side, and by a lobe 126 of the second conducting element 120 on the other side, with adjacent enclosed areas 130 being separated by crossing points of said first and second conducting elements 110, 120.

A current flowing in the first lobed portion 114 thereby produces a magnetic field in each of the enclosed areas 130 which is opposite in direction to the magnetic field in adjacent enclosed areas 130.

In this embodiment, the respective second ends of the first and second lobed portions 114, 124 are connected to each other at a centre tap 140 to form an autotransformer. The centre tap 140 is connected to ground. Therefore the magnetic coupling between the respective lobes of the first and second lobed portions 114, 124 at each enclosed area 130 is negative. As a result, the magnetic coupling between the first and second lobed portions 114, 124 has a negative magnetic coupling coefficient k.

In this embodiment, the centre tap 140 is located at a crossing point of the first and second lobed portions 114, 124 to facilitate the connection. Being located at an end of the first and second lobed portions 114, 124 and between the first and second terminals P1, P2, the design of the transformer 100 provides convenient access to the centre tap 140.

In this embodiment, the first and second lobed portions 114, 124 have an equal and even number of lobes 116, 126, forming a symmetric pattern. This results in at least partial cancellation of the magnetic fields from adjacent pairs of enclosed areas 130, thereby reducing the sensitivity of the transformer to external radiation.

In the embodiment shown in FIG. 2, the first and second lobed portions 114, 124 each comprise four lobes 116, 126, each comprising a half turn of the respective conducting element 110, 120. However, different numbers and shapes of lobes may be used, depending on the coupling strength required and the area available.

The first and second outer portions 112, 122 further include a respective tuning element 150, 152, in the form of a full turn of the respective first/second conducting element 110, 120. The tuning elements 150, 152 provide a means for convenient tuning of the transformer values for fine tuning and optimisation during the design stage. The dimensions of the tuning elements 150, 152 can be stretched in one or both of the vertical and horizontal directions (i.e., in the plane of the transformer 100), for example to optimise the transformer for a given frequency range. The shape of the loops of the tuning elements 150, 152 may also be varied. However, the tuning elements 150, 152 may be omitted if a particularly small footprint is required for the transformer.

The first and second tuning elements 150, 152 shown in FIG. 2 are also coupled magnetically with a low negative coupling coefficient k, so the overall magnetic coupling coefficient of the autotransformer 100 is still negative.

In the embodiment shown in FIG. 2, the first and second outer portions 112, 122 have straight portions, which may be helpful in reducing the overall area of the transformer 100. However, other configurations may be used.

Figure 3:
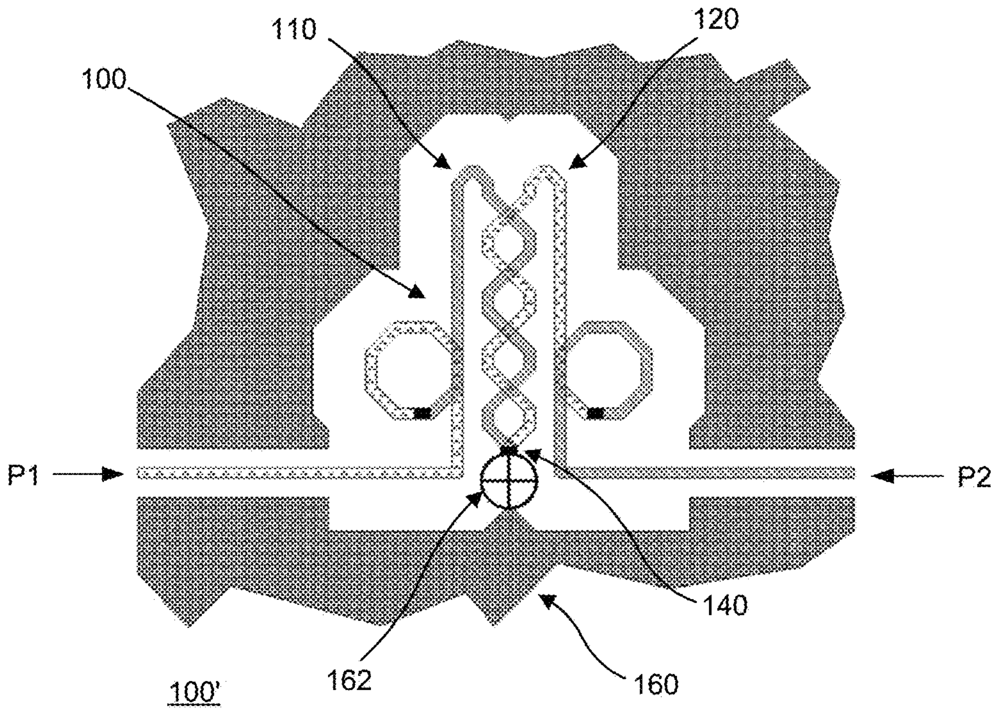
FIG. 3 shows a configuration of a transformer according to another example embodiment of the present disclosure.

FIG. 3 illustrates a transformer 100' according to another example embodiment of the disclosure. Elements corresponding to those of transformer 100 described above with reference to FIG. 2 are labelled with identical reference numbers.

FIG. 3 differs from FIG. 2 in that the transformer 100 is shown surrounded by a ground plane 160. The transformer 100' is formed on a substrate, for example, any dielectric or semiconductor substrate, including silicon and GaN, or a PCB. The first and second conducting elements 110, 120 are formed by metallization on the substrate. An (n−1)th layer of metallization is used to form the parts of the conducting elements 110, 120 indicated by a black and white pattern. An nth layer of metallization is used to form the parts of the conducting elements 110, 120 indicated by grey shading. In the present embodiment, the conducting elements 110, 120 are formed using only the angles (0, 45, 90 degrees) available in the GaN fabrication process. However, other angles and curvatures may be available in other processes. The ground plane 160 may be formed as part of the (n−1)th or nth layer of metallization, or as a lower layer. In the embodiment shown in FIG. 3, the centre tap 140 is connected to the ground plane 160 by a switch 162. However, a permanent connection may be used depending on the application.

Importantly, the design of the transformer 100, 100' of the present disclosure is optimised to allow convenient access to the centre tap 140, enabling an easy and efficient ground connection in the present embodiment. Additionally, the first and second terminals P1, P2 are located symmetrically to each side of the transformer 100, facilitating routing of connections and thus minimizing loses.

Figure 4:
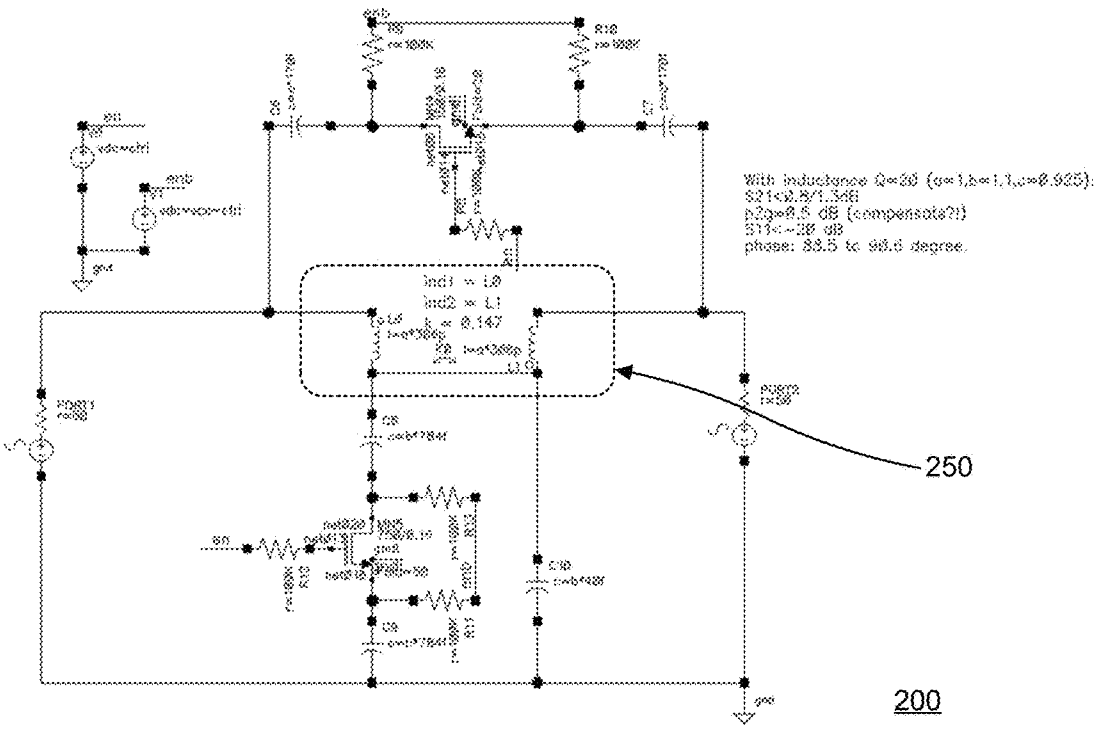
FIG. 4 illustrates a passive phase shifter comprising a transformer according to an example embodiment of the present disclosure.

FIG. 4 illustrates a 0/90° Passive Phase shifter (PPS) 200 comprising an autotransformer 250 which may be implemented using the transformer 100, 100' described above with reference to FIGS. 2 and 3. For this application, an autotransformer 250 having a low, negative value of k is required to minimise losses. In addition, the input and output must be as close as possible for ease of routing and thus minimising losses. The layout must also be compliant with a low-impedance path to the ground reference.

Figure 5:
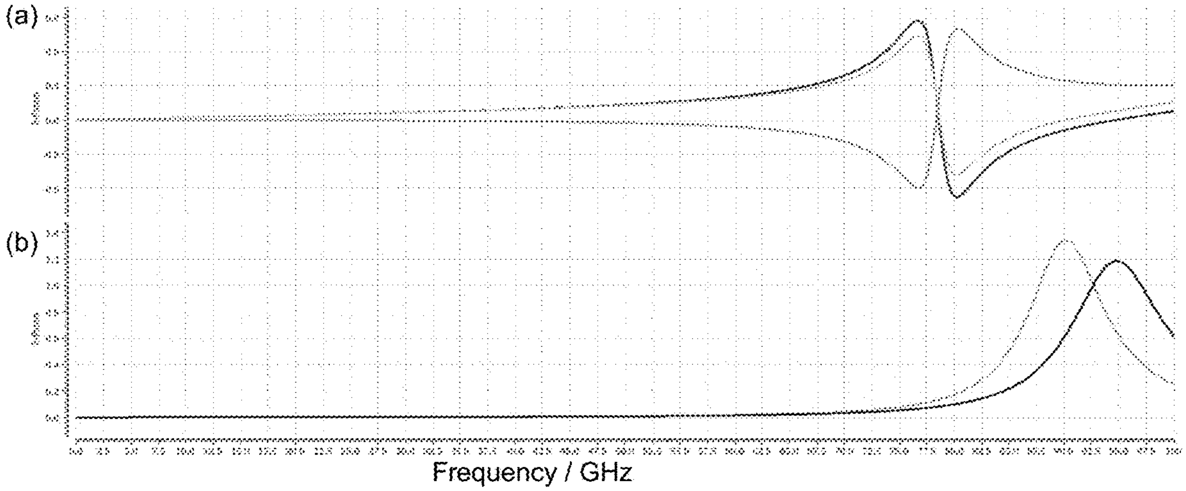
FIG. 5 presents simulation results for (a) the individual inductances (top two traces) and mutual inductance (lower trace) of the primary and secondary sides of the transformer of FIG. 2 (optimised for 28 GHz) as a function of frequency and (b) the resistances of the primary and secondary sides of the transformer of FIG. 2 (optimised for 28 GHz) as a function of frequency.

FIG. 5 presents simulation results for the transformer 100, optimised for 28 GHz. The upper graph shows the individual inductances (top two traces) and mutual inductance (lower trace) of the first and second conducting elements 110, 120 (i.e., the primary and secondary sides of the transformer) as a function of frequency. It can be seen that the inductances are substantially equal across a large frequency range, and that the mutual inductance is weak and negative, with an absolute value below 0.05. The lower graph of FIG. 5 shows the resistances of the first and second conducting elements 110, 120 (i.e., the primary and secondary sides of the transformer) as a function of frequency. It can be seen that the resistances are substantially equal across a large frequency range. The transformer is operable over a wide frequency band and can be optimised for any frequency during the design phase, in particular by varying the area of the tuning elements 150, 152.

Whereas existing transformer designs are very area consuming or have a high magnetic coupling coefficient leading to high losses, the design of the transformer 100 of the present disclosure provides a transformer having a weak magnetic coupling coefficient, without consuming a high area and is therefore advantageous in applications requiring a low-k transformer. For example, the integrated 0/90° Passive Phase shifter (PPS) 200 requires a negatively-coupled autotransformer having a low absolute value of magnetic coupling coefficient k in order to achieve low absolute losses, a low difference in losses between the 0° and 90° modes (that is, a low Phase to Gain or P2G) and a low variation in phase shift ΔΦ between the 0° and 90° modes of the passive phase shifter 200 as a function of magnetic coupling coefficient k.

Accordingly, there has been described a transformer and an integrated passive phase shifter comprising the transformer. The transformer includes a first conducting element having a first lobed portion arranged to form a first plurality of lobes. The transformer includes a second conducting element having a second lobed portion arranged to form a second plurality of lobes. The first lobed portion overlaps said second lobed portion to define a plurality of enclosed areas.

Embodiments of the transformer include monolithic on-chip transformers. The transformer may be fully symmetrical. The transformer is particularly suitable for implementation as an autotransformer having a weak, negative magnetic coupling.

Although particular example embodiments of the disclosure have been described above, it will be appreciated than many modifications, including additions and/or substitutions, may be made within the scope of the appended claims.

The invention claimed is:

1. A transformer comprising:
- a substrate;
- a first terminal;
- a second terminal;
- a centre tap;
- a first conducting element coupled to the first terminal and having a first lobed portion with a first end coupled to the first terminal, a second end, and a first plurality of lobes between the first and second ends of the first lobed portion, and wherein the first plurality of lobes corresponds to a first sequence of partial turns, with each successive lobe of the first plurality of lobes winding in an opposite sense to a preceding lobe of the first plurality of lobes; and
- a second conducting element coupled to the second terminal and having a second lobed portion with a first end coupled to the second terminal, a second end, and a second plurality of lobes between the first and second ends of the second lobed portion, and wherein the second plurality of lobes corresponds to a second sequence of partial turns, with each successive lobe of the second plurality of lobes winding in an opposite sense to a preceding lobe of the second plurality of lobes, wherein said first lobed portion overlaps said second lobed portion to define a plurality of enclosed areas, wherein adjacent enclosed areas are separated by crossing points of said first and second conducting elements, wherein the second end of the first lobed portion is connected to the second end of the second lobed portion to form the centre tap, and wherein the first lobed portion and the second lobed portion are formed using first and second layers of metallization on the substrate.

2. The transformer according to claim 1, wherein a number of lobes comprised by said first plurality of lobes is equal to a number of lobes comprised by said second plurality of lobes.

3. The transformer according to claim 1, wherein the number of lobes comprised by said first plurality of lobes is an even number.

4. The transformer according to claim 1, wherein said first conducting element further comprises a first outer portion connected at one end to the first end of said first lobed portion, and connected at another end to the first terminal, and said second conducting element further comprises a second outer portion connected at one end to the first end of said second lobed portion and connected at another end to the second terminal.

5. The transformer according to claim 4, wherein said first outer portion and said first lobed portion are arranged to form a first loop; and said second outer portion and said second lobed portion are arranged to form a second loop, said second loop at least partially overlapping said first loop.

6. The transformer according to claim 4, wherein at least a portion of said first outer portion and/or said second outer portion is substantially straight.

7. The transformer according to claim 1, wherein said transformer is substantially symmetric.

8. The transformer according to claim 1, wherein said second end of said first lobed portion, said second end of said second lobed portion, and said centre tap are connected to ground.

9. The transformer according to claim 1, wherein said transformer is an autotransformer.

10. The transformer according to claim 4, wherein said first outer portion includes a full turn of the first conducting element, and said second outer portion includes a full turn of the second conducting element.

11. The transformer according to claim 1, wherein each lobe of said first and second plurality of lobes comprises only a half turn of the respective conducting element.

12. The transformer according to claim 4, wherein a number of lobes comprised by said first plurality of lobes is equal to a number of lobes comprised by said second plurality of lobes.

13. The transformer according to claim 4, wherein the number of lobes comprised by said first plurality of lobes is an even number.

14. The transformer according to claim 1, wherein the second end of the first lobed portion, the second end of the second lobed portion, and the centre tap are connected to ground through a switch.

15. The transformer according to claim 1, wherein the second end of the first lobed portion, the second end of the second lobed portion, and the centre tap are connected to ground through a permanent connection.

16. The transformer according to claim 1, wherein:

the first lobed portion and the first plurality of lobes are formed using a first layer of metallization on the substrate; and the second lobed portion and the second plurality of lobes are formed using a second layer of metallization on the substrate.

17. The transformer according to claim 1, further comprising:

a ground plane surrounding the first and second conducting elements and formed as part of one of the first layer of metallization and the second layer of metallization.

18. The transformer according to claim 1, further comprising:

a ground plane formed as part of a third layer of metallization on the substrate.

19. The transformer according to claim 1, wherein each of the first plurality of lobes and the second plurality of lobes includes more than two lobes.

20. A passive phase shifter comprising:

a transformer that includes a substrate;

a first terminal;

a second terminal;

a centre tap;

a first conducting element coupled to the first terminal and having a first lobed portion with a first end coupled to the first terminal, a second end, and a first plurality of lobes between the first and second ends of the first lobed portion, and wherein the first plurality of lobes corresponds to a first sequence of partial turns, with each successive lobe of the first plurality of lobes winding in an opposite sense to a preceding lobe of the first plurality of lobes; and a second conducting element coupled to the second terminal and having a second lobed portion with a first end coupled to the second terminal, a second end, and a second plurality of lobes between the first and second ends of the second lobed portion, and wherein the second plurality of lobes corresponds to a second sequence of partial turns, with each successive lobe of the second plurality of lobes winding in an opposite sense to a preceding lobe of the second plurality of lobes, wherein said first lobed portion overlaps said second lobed portion to define a plurality of enclosed areas, wherein adjacent enclosed areas are separated by crossing points of said first and second conducting elements, wherein the second end of the first lobed portion is connected to the second end of the second lobed portion to form the centre tap, and wherein the first lobed portion and the second lobed portion are formed using first and second layers of metallization on the substrate.

* * * * *